May 28, 1963    W. L. WELLFORD, JR., ET AL    3,091,351
STORAGE BIN

Filed March 27, 1962    2 Sheets-Sheet 1

May 28, 1963 W. L. WELLFORD, JR., ET AL 3,091,351
STORAGE BIN
Filed March 27, 1962 2 Sheets-Sheet 2

United States Patent Office 3,091,351
Patented May 28, 1963

3,091,351
STORAGE BIN
Walker L. Wellford, Jr., James A. Farnham, and Henry L. Carson, Memphis, Tenn., assignors to J. E. Dilworth Co., Inc., Memphis, Tenn., a corporation of Tennessee
Filed Mar. 27, 1962, Ser. No. 182,780
3 Claims. (Cl. 214—17)

This invention relates to certain new and useful improvements in storage bins, and particularly relates to improvements in storage bins adapted for storage and handling of divided solid materials which do not flow easily, such as wood chips, sawdust, seed corn, and other materials of comparable characteristics.

One of the principal problems heretofore encountered in storage bins utilized for the storage and handling of materials having the characteristics of materials such as those mentioned arises in the attempts to withdraw these materials from the storage bin and transport them to use areas away from the storage bins. In the handling of such divided solid materials which are stored in bins, prior efforts have been directed toward withdrawing the material from the bottom of the bins by the use of screw conveyors. Because the material does not flow easily and has an undesirable tendency to pack together tightly (in fibrous materials, the fibers interlock) the packed material provides tremendous resistance to the screw conveyors. The magnitude of this resistance is demonstrated by the fact that often the material resists the action of the screws to such an extent that the screws break off. If stronger screws are employed, it is not uncommon that the shafts driving the screws will themselves break. In addition, because of this tendency of the material to pack itself, it is found that in the process of removing the material from the bottom of the storage bin, the material will tend to establish an arching condition and support the material above and away from the conveyor and effectively prevent further withdrawal of the material from the storage bin.

In other prior art attempts to remove such material, conveyor chains have been employed, including steel teeth on the chains, the object being to drag the chains through the material and, with the aid of the teeth, to convey the material out of the storage bin. Such attempts have, however, generally been unsuccessful. In cases where a steel chain having high tensile strength was employed, as the chain was urged against the material, it would typically break after but a few hours of operation. If, on the other hand, the chains were not continually urged against the material, the material would arch away from the chain and no longer be conveyed thereby.

Moreover, because of the tendency of the material to arch, it has in the past typically been necessary for a man to be at hand to aid the discharging action of mechanisms such as the screw and chain conveyors discussed above, in order to break the arches as they formed, so as to make the withdrawal operation continuous. Furthermore, because of the frequent tendency of apparatus of this kind to break down, considerable manpower and expense has been involved in repairs.

A novel type of storage bin structure has recently been proposed employing a turnable floor which is rotatably supported above a stationary base on which the bin walls rest by a plurality of roller means located about its outer periphery. This rotatable floor bears the bulk of the divided solid material on its top surface, which is smooth and free of projections, and includes a plurality of apertures, disposed both radially and circumferentially over its surface, to dislodge the material and cause it to pass downwardly therethrough onto the base as the floor is rotated by a drive mechanism located on its periphery. These apertures provide a relatively even but controlled rate of flow of the stored material downwardly throughout the entire area of the bin as the floor is rotated, and a conveyor apparatus located beneath the floor is then able to remove the material easily, while avoiding packing of the material into an arching state.

This last-mentioned approach, of utilizing a basically smooth surface, free of projecting elements, for the supporting floor element, which permits the floor on which the stored material rests to be rotated readily beneath the bottom surface of the mass with relatively little resistance being offered thereby, is basically different from any conventionally employed in the storage and discharge of divided solid materials of the type described. Such an approach has solved certain long-standing and extremely difficult problems associated with withdrawal of the stored material.

However, certain difficulties have been encountered in the operation of certain forms of apparatus of the general type described above which lessen its effectiveness. In partichular, it has been found that despite the employment of shielding means, such as deflectors, baffles, and the like, the divided solid material sometimes tends to seep into the internal parts of the roller assembly which provides rotatable support for the turnable floor, thereby causing the resistance of the floor to rotation to be increased to a considerable degree, and may eventually jam the roller mechanism altogether unless the material is periodically cleaned away. In addition, since the weight of the stored material carried by the rotatable floor is transferred to the roller means located on the peripheral edge thereof, a relatively large force, which must be supplied by the driving means, is needed to overcome the friction provided by the interface between the roller assembly and its supporting track while the floor is rotated.

The present invention provides a storage bin apparatus of improved design incorporating all the advantages obtained from a rotatable floor of smooth configuration, and, in addition, provides a solution to the above-described difficulties which have heretofore been associated with such an apparatus. In particular, the present apparatus provides for the rotatable floor to be supported at its center by hydraulic means, rather than at its periphery by rollers. As the weight of the rotatable floor and the mass stored above rests entirely on a body of hydraulic fluid, the frictional forces which tend to oppose rotation of the floor relative to its support are made vanishingly small.

Furthermore, in certain embodiments of the invention, through regulation of the hydraulic pressure, which supports the weight of the floor and the stored material carried upon it, the height of the floor above its foundation base may be varied readily.

Therefore, a major feature of the present invention is the provision for a storage bin, for divided solid material of the type herein described, in which the lower end of the bin area is defined by a rotatable floor structure, centrally supported by hydraulic means, having a smooth upper surface containing a plurality of spaced apertures formed therein for effectuating the withdrawal of material deposited in the bin above the floor.

Thus, a principal objective of the present invention is generally to improve the design, construction, and efficiency of storage bins of the type wherein a smooth, rotatable floor structure containing a plurality of apertures is provided for effectuating the withdrawal of divided solid material, deposited in the bin above the rotatable floor, having the characteristics of not flowing readily and of packing together tightly and arching.

A further objective of the present invention is to provide a central rotatable support for a turnable floor structure in a storage bin for such material which eliminates the need for supporting roller means, located about its outer periphery, which are subject to fouling.

A still further objective of the invention is to provide a rotatable support for a turnable floor structure in a storage bin which does not require special shielding means for preventing the entry of the stored material into moving parts of the apparatus.

And yet another objective of the invention is to provide a smooth, rotatable floor structure for a storage bin whose elevation above a stationary foundation on which the storage bin rests may be varied readily.

The foregoing and other objectives, features, and advantages of the invention will be more readily understood upon consideration of the following detailed description of the invention, taken in conjunction with the accompanying drawings.

Figure 1:
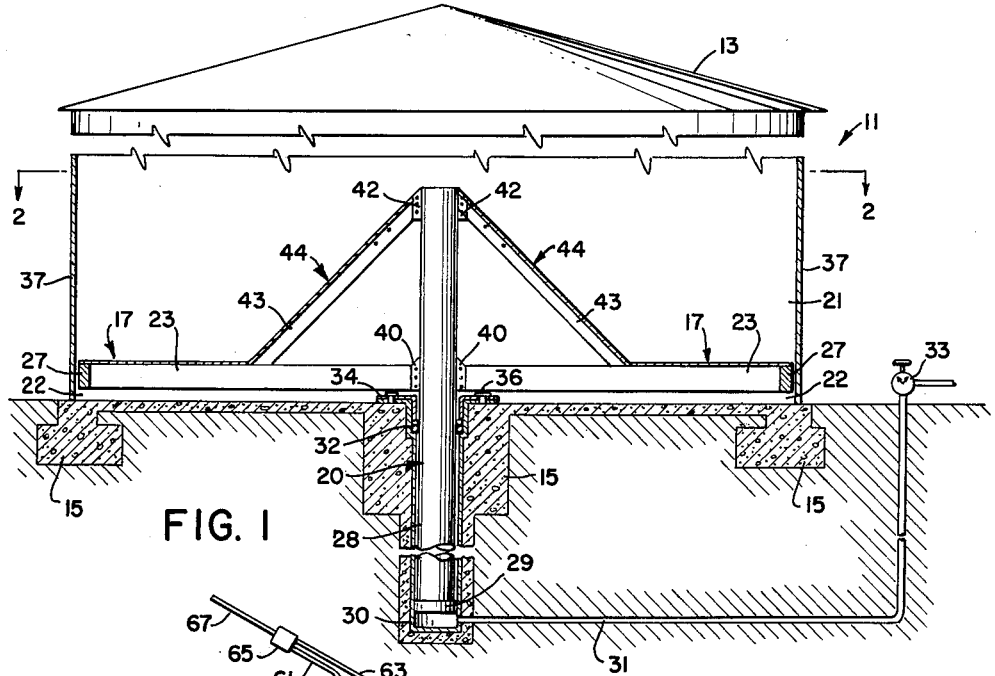
FIG. 1 is a fragmentary front view of an embodiment of a storage bin structure according to the present invention, partially in elevation and partially in section, the sectional plane passing through a diameter of the rotatable floor as along the line 1—1 of FIG. 2.

Referring now to the drawings in which the various parts are indicated by numerals, the present structure essentially comprises a tank-like body provided with an overlying roof for top closure and is supported from a foundation formed of concrete flooring or other base material. Within the tank structure a bin storage area 40 is defined by a turnable floor mounted adjacent the bottom of the tank structure, but spaced above the base, to provide a lower chamber beneath the floor through which discharge and withdrawal of the stored material may be effected.

Thus, in the embodiment of the storage bin shown in the present drawings, there is provided a tank-like shell structure 11, preferably of substantially cylindrical conformation, which is capped at its top with an overlying roof 13. Suitable means for conveying and depositing divided solid material which is to be stored in the bin area 21 have been omitted from the embodiment of the invention shown in the drawings. Such means, which may include a collector of the "cyclone" type incorporated into the roof 13 of the storage bin, are conventional and form no part of the present invention. Underlying the body 37 of the tank structure 11 is a concrete support base 15. It will be understood that, while it is preferable to form the foundation 15 of concrete, other suitable base material may be utilized without departing from the invention.

Spaced above the support base 15 is a turnable floor 17 which divides the volume confined by the storage bin 11 into two chambers. The upper chamber 21 is bounded on its bottom by the top surface of the rotatable floor itself, on which the bulk of the stored material is carried. The lower chamber 22, forming a discharge area immediately beneath the understructure of the rotatable floor 17, is bounded below by the stationary base 15. The turnable floor 17 is mounted for rotation relative to base 15 upon a central hydraulic bearing assembly 20 whose constructional features will subsequently be described in detail. The upper surface of the turnable floor is smooth and free of projecting elements which might tend to pack the stored material together as the floor is rotated. The floor is of generally circular configuration with a diameter slightly less than the inner dimension of the tank body 37 to provide a small clearance therebetween for rotation. The central portion of the floor's surface is preferably a conical frustum 44 for better distribution of the stress imposed by the weight of the floor and the stored material on the hydraulic bearing assembly 20.

Figure 2:
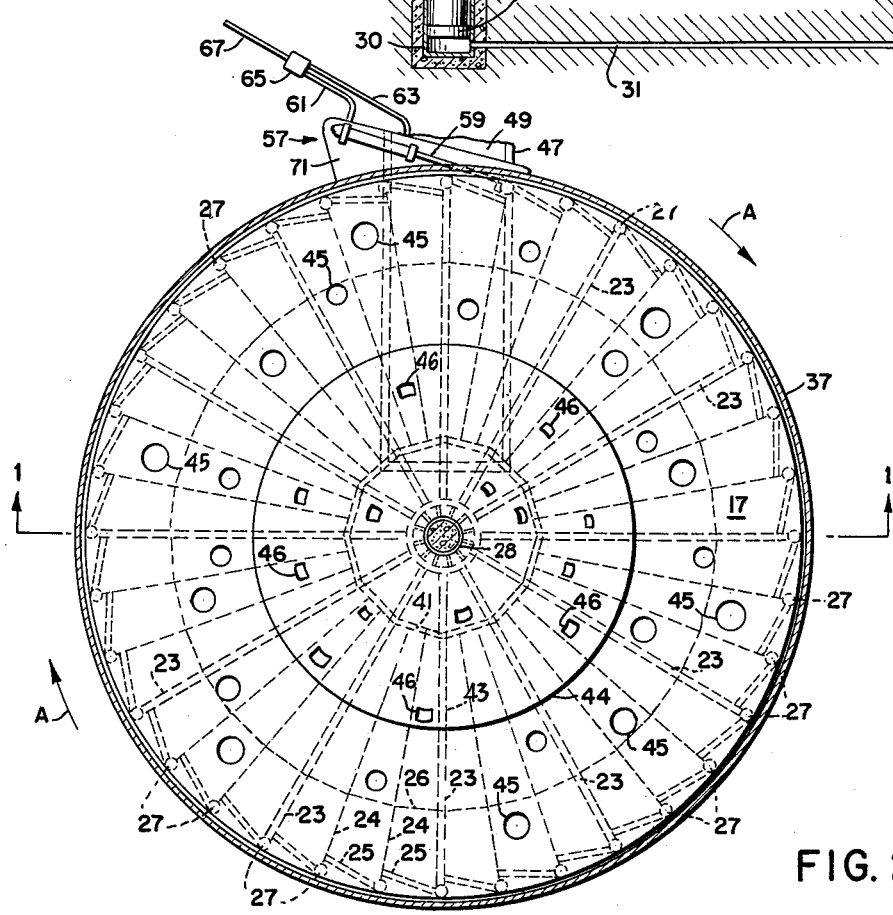
FIG. 2 is a plan view, partially sectional, of the rotatable floor taken along the line 2—2 of FIG. 1.

As may be seen in FIG. 2, the rotatable floor 17 is perforated with a plurality of apertures 45 and 46 of varying dimension disposed both radially and circumferentially over the entire surface of the floor. These openings serve to dislodge the material stored in the bin area 21, as the floor is rotated, and permit it to pass downwardly therethrough to the discharge area 22. The apertures 45, located along the outer portion of the turnable floor 17, are preferably circular, whereas the openings 46, disposed about the frusto-conical section 44 of the floor's surface, are preferably trapezoidal in form to facilitate the discharge of material in the central portion of the stored mass to the lower chamber 22. The size and location of the respective apertures 45 and 46 in the turnable floor 17 are chosen so as to provide a relatively even but controlled rate of flow of the stored material downwardly throughout the entire area of the bin as the floor is rotated.

Figure 3:
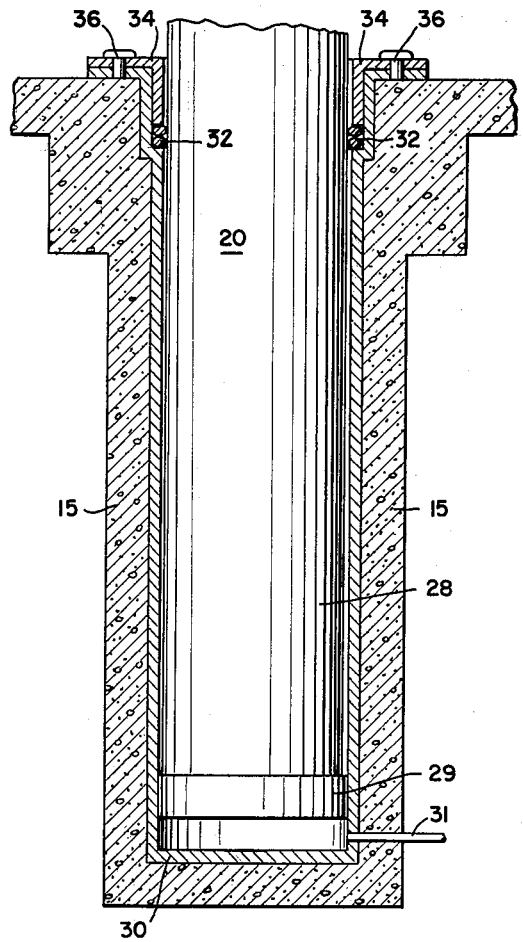
FIG. 3 is an enlarged view, partially sectional, of a portion of FIG. 1 showing the hydraulic mechanism for supporting the rotatable floor.
Figure 4:
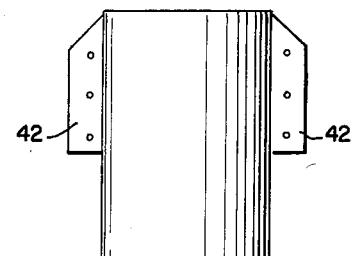
FIG. 4 is a plan view, partially fragmentary, of the plunger portion of the hydraulic mechanism which supports the rotatable floor.

As may best be seen in FIGS. 1 and 3, the central hydraulic assembly 20, upon which the turnable floor 17 is rotatably supported, comprises a movable plunger ram 28 of cylindrical cross section which is restrained against transverse movement within casing 30 by bearing ring 29 and is subject to axial displacement with respect thereto by hydraulic fluid pressure supplied by a conduit line 31 and controlled by suitable means such as a valve regulator 33. The seal between the hydraulically-supported plunger 28 and its casing 30 is maintained by a packing gland 32 placed in compression by a ring flange 34 affixed to the upper end of the casing 30 with suitable fastening means such as studs 36.

Rigidly secured to the upper part of the hydraulically-supported plunger element 28 at fins 40 and extending radially therefrom are a plurality of spaced, major girders 23 which comprise the supporting understructure for the floor 17. A plurality of beams 43, secured to the end of the plunger 28 at fins 42 and angled downwardly to connect with girders 23, similarly support the frustro-conical central portion 44 of the floor surface. Between each set of major radial girders 23 are interposed a pair of minor radial girders 24 (FIG. 2) which trisect the angle therebetween and are connected thereto by respective inner and outer cross-links 41 and 26. At the outer end of each of the radial girders 23 and 24 is connected a chord member 25 which links each of the girders to its immediate neighbor and serves to further strengthen the understructure at the periphery of the floor. Each of the radial members 23 and 24 is terminated in a bulbous lug 27 which cooperates with a hydraulic actuator for rotatably driving the turnable floor 17 in a manner which will hereinafter be described.

When the turnable floor 17 is rotated, the plurality of apertures 45 and 46, underlying the material contained in the storage area 21 of the bin, is effective to form a base agitation of the material so as to keep it sufficiently loosened to prevent packing or arching, and to cause discharge of the same downwardly through the apertures onto the base 15. The radial beam members 23 and 24, in addition to providing the understructure for the floor 17, act as sweeps on the bin material, which has been downwardly discharged into the lower chamber 22, as the floor rotates, and serve to move the material towards a pit area 47 and onto a conveyor belt 49 contained therein for its withdrawal from the storage bin 11.

Figure 5:
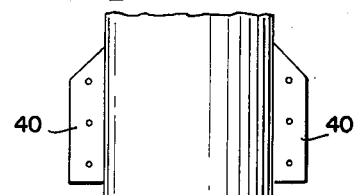
FIG. 5 is a fragmentary sectional plan view illustrating means for rotating the turnable floor, the top surface of the floor being omitted for purposes of clarity.
Figure 5:
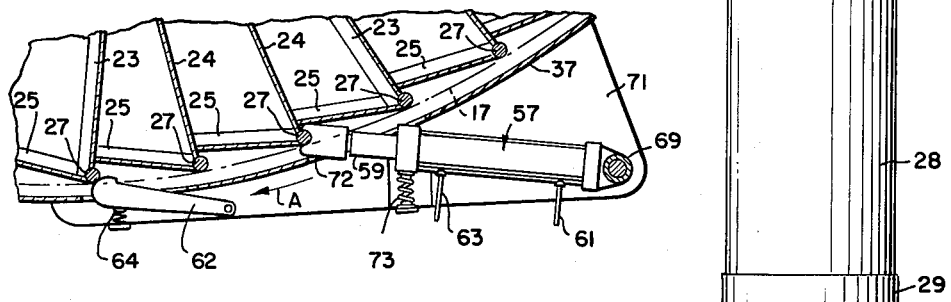

As the surface of the turnable floor is smooth and free of any projections which might tend to pack the bin material together, a relatively small force is required to effect rotation of the floor. In FIG. 5 there is shown an embodiment of a peripheral drive mechanism, exemplified by a reciprocating hydraulic actuator 57, for imparting the desired rotary movement to the turnable floor 17. Through location of the rotary driving means at the periphery of the floor, the benefit of a substantial mechanical advantage over a centrally-located drive is obtained by reason of the large moment arm provided by the floor's radius. The hydraulic actuator assembly 57 includes a reciprocable ram 59 which is supplied with hydraulic fluid under pressure through feed lines 61, 63 leading to opposite ends of the hydraulic cylinder of the assembly from a reciprocating valve 65 to which fluid is supplied by conduit 67 from a source of hydraulic pressure (not shown). Such an arrangement for obtaining reciprocating action of a hydraulic actuator is substantially conventional and is shown somewhat schematically in FIG. 2.

As is shown in FIG. 5, hydraulic assembly 57 is pivotally mounted at 69 on a support piece 71 rigidly secured to a portion of the tank body 37 and is aligned in a generally tangential direction to the turnable floor 17. The distal end of the reciprocable ram 59 extends through a slot 72 in the tank wall 37 and is disposed for successive engagement with the bulbous or pin-like lugs 27. With each forward stroke of the ram 59 the engaged lug is moved in the direction of rotation indicated by arrow A. Upon the full extension of the ram on the forward stroke, the reciprocating valve 65 causes the ram to reverse its action and move into a position to pick up the next succeeding lug. For this purpose a compression spring 73 is interposed between the support 71 and the hydraulic actuator assembly 57, urging the assembly in an inward direction towards the lugs and thus insuring the successive positioning of the distal end of the ram for reengagement with a next succeeding lug. As the stored material sometimes resists rotation of its mass to the extent of generating a restoring force of sufficient magnitude to return the floor 17 to its former position after each rotational progression, a no-back ratchet 62 with an associated compression spring 64 is provided for engaging the trailing side of the advanced lug and preventing the floor from back-tracking to its former position after each step advance.

It will be seen that the peripheral drive supplied by the hydraulic actuator assembly 57 is a convenient and simple means for providing the force required to effect the turning of the floor 17 in a substantially continuous pattern of rotation. It will be understood that other means of effecting rotation of the floor 17 may be employed without departing from this invention.

A further advantage obtained by supporting the rotatable floor 17 on the central hydraulic bearing 20 is that the height of the floor above the stationary base 15 may be readily varied through regulation of the hydraulic fluid pressure provided by valve 33. It may be desirable to raise the rotatable floor during installation of the storage bin or during the course of its use to allow personnel to enter the lower chamber area 22 underneath the understructure of the floor to facilitate cleaning of the area and to permit maintenance and repair of the hydraulic bearing assembly and the conveyor pit area 47.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. In a storage structure, a shell member defining a storage cavity therein, a foundation supporting said shell member and closing the bottom thereof, a rotatable unloader floor disposed in the bottom of said cavity within said shell member and serving to support the material stored in said cavity, means to rotate said floor, said floor having a plurality of apertures therein adapted to dislodge and pass material stored in said cavity downwardly through said floor as said floor is rotated, means disposed beneath said floor to carry off the stored material dislodged by said floor, and a central hydraulic bearing for vertically supporting said floor on a body of fluid to thereby facilitate rotation thereof, said hydraulic bearing including means for lifting and lowering said floor by hydraulic pressure during installation, maintenance, and repair of said storage structure.

2. In a storage structure for divided solid material comprising, in combination, a stationary base, wall means supported on said base and forming the sides of a cavity, a rotatable unloader floor disposed near the bottom of said cavity and serving to support the material stored in said cavity, means to rotate said floor, said floor having a plurality of perforations therein with the upper surface of said floor being smooth except for said perforations, said perforations being adapted to dislodge and pass material stored in said cavity downwardly through said floor as said floor is rotated, and means disposed beneath said floor to carry off the stored material dislodged by said floor; the improvement comprising, a central hydraulic bearing for vertically supporting said floor while facilitating the rotation thereof, said hydraulic bearing including a vertically-disposed cylindrical casing, a fluid-lubricated cylindrical plunger ram horizontally restrained within said casing and connected to said unloader floor at the center thereof, the bottom of said plunger ram being supported within said casing hydraulically by fluid under pressure, and means for regulating the pressure of said hydraulic fluid to thereby permit lifting and lowering of said floor during installation, maintenance, and repair of said storage structure.

3. The combination set forth in claim 2 with the further improvement that the upper surface of said unloader floor comprises a flat, perforated outer portion and a perforated inner portion of frustro-conical shape, the shape of said inner portion serving to better distribute the stresses transmitted by the weight of the stored material to the plunger ram supporting said floor.

References Cited in the file of this patent

UNITED STATES PATENTS

| 1,460,067 | Laird | June 26, 1923 |
| 1,554,207 | Fincher | Sept. 22, 1925 |
| 1,942,276 | Clapp | Jan. 2, 1934 |
| 2,248,903 | De Florez | July 8, 1941 |
| 2,755,942 | Broberg | July 24, 1956 |
| 2,767,884 | Gross | Oct. 23, 1956 |

FOREIGN PATENTS

| 352,436 | Germany | Apr. 27, 1922 |

OTHER REFERENCES

National Hardwood Magazine, June 1960.